June 5, 1956  E. L. WOOD  2,749,186
WHEEL TRIM, INCLUDING SELF-CENTERING AND CUSHIONING MEANS
Filed Nov. 1, 1954  2 Sheets-Sheet 1
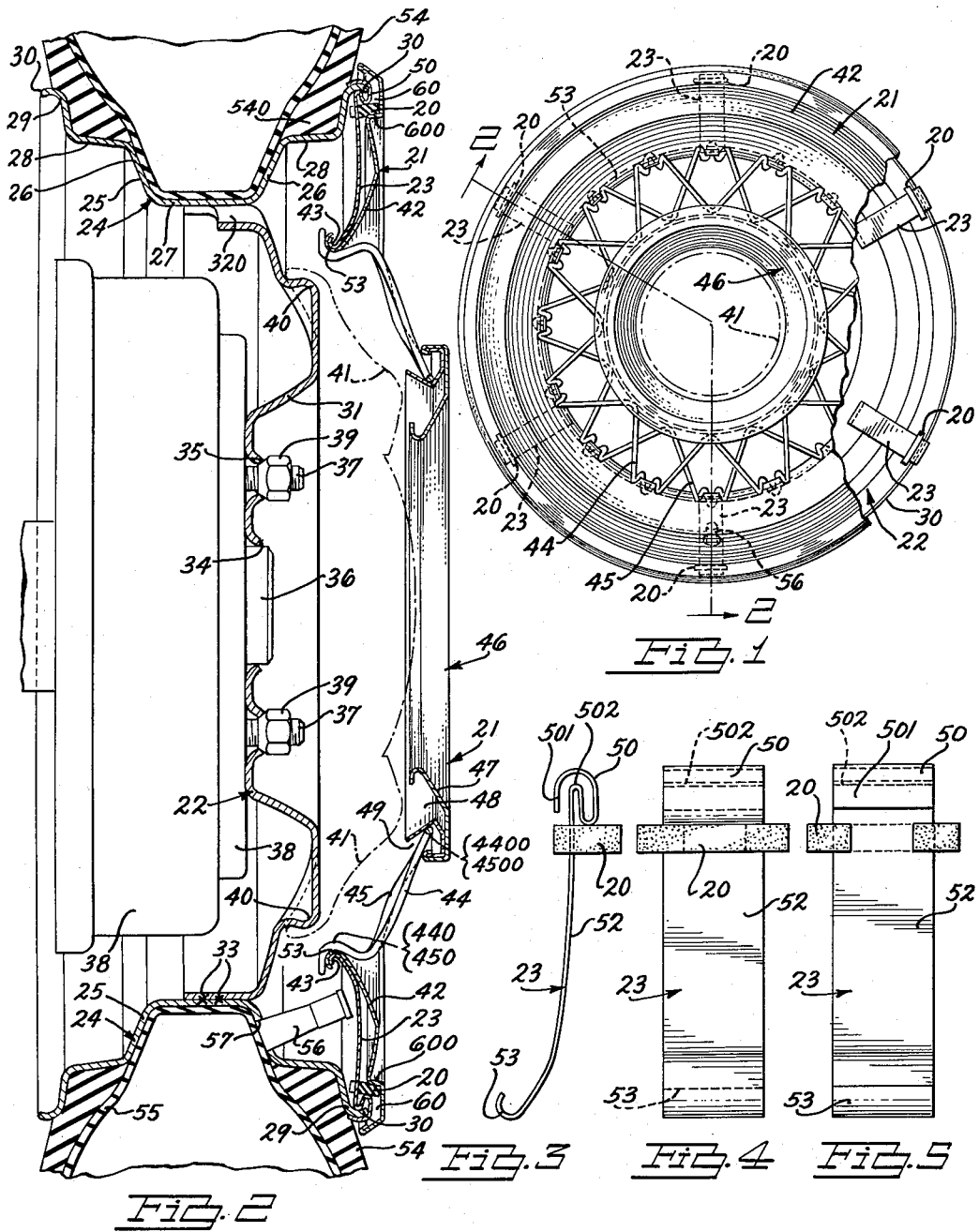
INVENTOR.
EDWARD L. WOOD
BY
Everett G. Wright
ATTORNEY INVENTOR.
EDWARD L. WOOD
BY
Everett G. Wright
ATTORNEY United States Patent Office 2,749,186
Patented June 5, 1956

2,749,186

WHEEL TRIM, INCLUDING SELF-CENTERING AND CUSHIONING MEANS

Edward L. Wood, Detroit, Mich., assignor, by direct and mesne assignments, to Gar Wood Industries, Inc., a corporation of Michigan Application November 1, 1954, Serial No. 465,841

5 Claims. (Cl. 301—37)

This invention relates to wheel trim construction of the type that is spring held onto a vehicle wheel, and in particular to a combination of the wheel trim, its spring securing means, and a cushioning means which both cushions the wheel trim in respect to the wheel and centers the wheel trim thereon.

This invention is an improvement over the wheel trim and wheel trim cushioning means disclosed in my pending application for patent Serial No. 455,679 filed September 13, 1954, entitled "Wheel Trim Cushioning Means."

The primary object of the invention is to provide, in combination, wheel trim and wheel trim securing and cushioning means which cooperate to releasably hold and center the wheel trim in cushioned relationship onto a wheel.

Another object of the invention is to provide, in combination with a wheel trim having a rearwardly facing annular groove near its outer periphery, means for securing the wheel trim to a wheel and cushioning said wheel trim in respect to said wheel simultaneously with maintaining said wheel trim centered on said wheel comprising a plurality of circumferentially spaced radially inwardly extending spring clips clamped over the outer lip of a wheel rim which engage the wheel trim at the inner ends thereof and bias the said wheel trim onto said wheel, and cushioning and centering blocks carried by said spring clips against which said wheel trim rests and with which a wall of the said annular groove in the wheel trim becomes engaged when the said wheel trim is secured to the wheel by said clips.

Other objects of the invnention will become apparent by reference to the following detailed description taken in connection with the accompanying drawing, in which:

Fig. 1 is an elevational view of a wheel having thereon self-centering wheel trim and wheel trim securing means illustrating the invention.

Fig. 2 is an enlarged sectional view taken on the line 2—2 of Fig. 1.

Figs. 3, 4 and 5 are side, front and rear elevational views respectively of a spring clip of the type employed to secure the wheel trim in spring loaded relationship onto the wheel, the said spring clip being equipped with a cushioning means which cooperates with a formation in the wheel ring to center the wheel trim in spring loaded cushioning relationship to the wheel.

Fig. 6 is an enlarged elevational view of the cushioning and centering block preferably employed on each spring clip.

Fig. 7 is a sectional view taken on the line 7—7 of Fig. 6.

Figure 8:
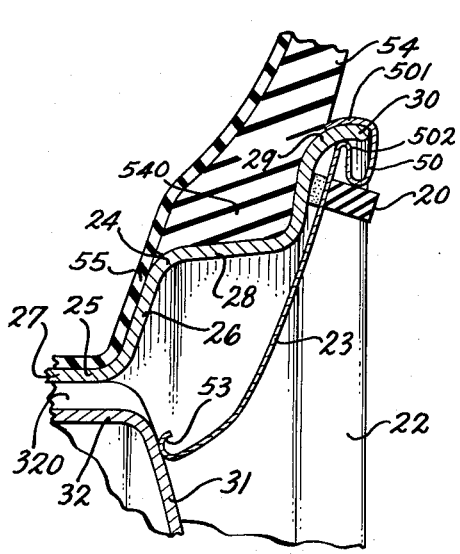
Fig. 8 is an enlarged fragmentary sectional view through a wheel and one of the wheel trim securing clips employed to secure wheel trim to the wheel, the securing clip having thereon a cushioning and centering block.

Referring now to the drawings wherein like numerals refer to like and corresponding parts throughout the several views, the invention is disclosed for illustrative purposes in connection with a wheel trim cushioning and centering means 20 which coacts with wire wheel simulating wheel trim 21, or other wheel trim adapted for the purpose, the said wheel trim 21 being secured to a vehicle wheel 22 by means of a plurality of spring clips 23. Obviously, other types of wheel trim such as wheel covers, wheel rings and the like may be spring secured to a wheel, and cushioned and centered in respect thereto by employing the invention.

The vehicle wheel 22 has a drop center rim 24 composed of a central channel 25 having side walls 26 and a base 27, a tire bead seat 28 extending laterally outward from each of the channel side walls 26, and a curved flange 29 extending upwardly and outwardly from each tire bead seat 28 terminating in an outer lip 30. Disposed within the center of the drop center rim 24 is a spider 31 having a flange 32 which is generally secured to the central channel 25 of the said drop center rim 24 by such means as welding at 33. The spider 31 is provided with a hub aperture 34 and securing stud holes 35 to accommodate respectively the wheel hub 36 and the studs 37 extending from the brake drum 38 to which the wheel 22 is secured by means of the usual wheel securing nuts 39. The flange 32 of the spider 31 is generally scalloped out at 320 at intervals around the periphery thereof to provide added structural strength to the wheel 22. The spider 31 preferably provided with a plurality of hub cap retainer nubs 40 over which a hub cap indicated by the dot and dash lines 41 is sprung, the said nubs 40 retaining the hub cap 41 onto the wheel 22.

Vehicle wheels of the type just described flex and weave slightly under running and shock loads as, for example, when the vehicle is turning a corner or when riding over a rough road. It is this flexing and weaving coupled with slight relative movement of the wheel trim in respect to the wheel that causes some wheel trim noises when the wheel trim 21 is secured by being spring-clipped onto the wheel 22. The flexing and weaving of the vehicle wheel 22 and shock loads thereon also causes the wheel trim 21 to tend to slip radially off center.

The particular wheel trim 21 shown for illustrative purposes is a wire wheel simulating wheel trim composed of a trim ring 42 having an inner annular groove 43 therein forming an inner rolled annular edge or bead 430 over which is sprung the outer hooked apexes 440 and 450 of staggered multi-pointed wire star shaped elements 44 and 45 employed to simulate the spokes of a wire wheel. Over the inner apexes of the star shaped wire spoke simulating elements 44 and 45 is sprung a central ornamental collar 46 formed of two pieces; namely, an outer ornamental ring 47 and an inner spoke engaging ring 48 having an annular groove 49 therein to accommodate the inner apexes of the said staggered star shaped wire spoke simulating elements 44 and 45. Obviously, any type of wheel trim may be substituted for the wire wheel simulating wheel trim 21 provided it includes an annular groove similar to the groove 43 therein to receive the spring clips 23 as hereinafter described.

Figure 9:
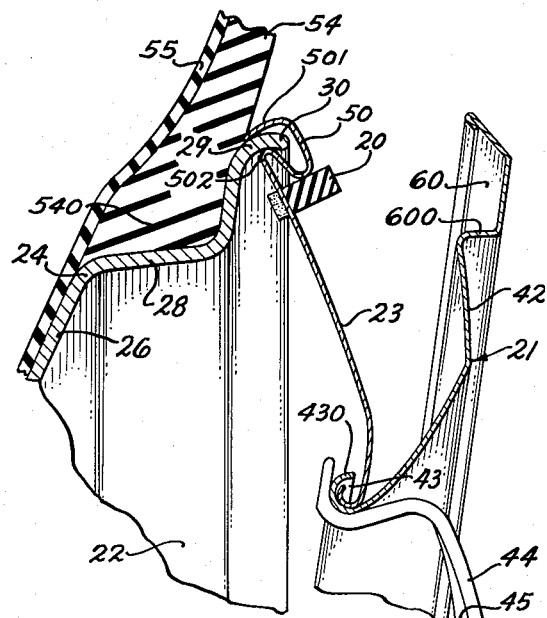
Fig. 9 is an enlarged cross sectional view similar to Fig. 8 except that wheel trim adapted to cooperate with the cushioning block and be centered thereby is shown engaged on the radially inward end of a wheel trim securing clip, the said wheel trim and securing clip being shown in the attitude assumed by them when in their extended position in respect to the wheel rim.
Figure 10:
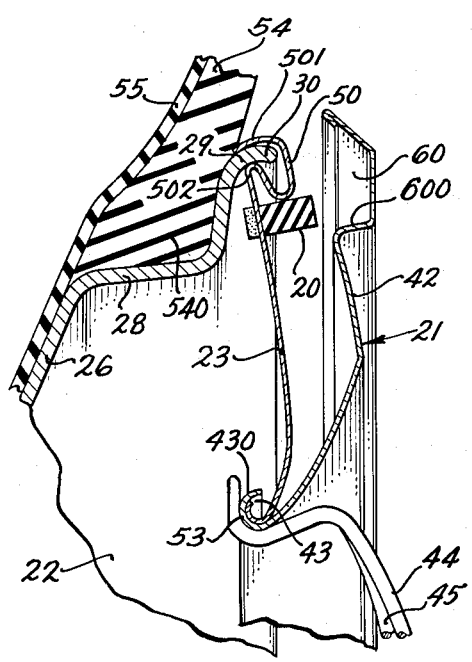
Fig. 10 is an enlarged cross sectional view similar to Fig. 9 except that the wheel trim has been sprung toward the wheel rim and has assumed a position just prior to engaging the cushioning and centering blocks carried by the wheel trim securing clips.
Figure 11:
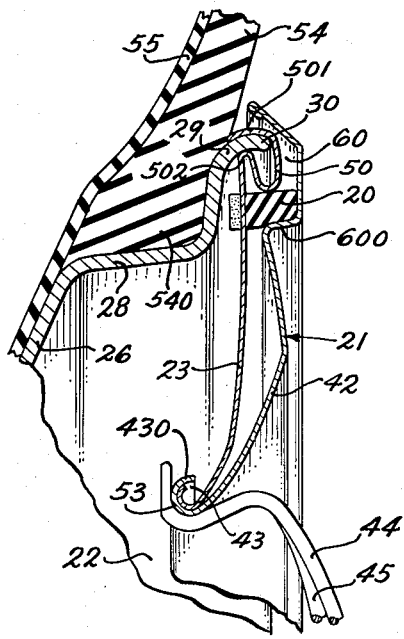
Fig. 11 is a cross sectional view similar to Fig. 10 except that the wheel trim has sprung to its cushioned centered relationship with respect to the wheel rim with the wheel trim cushioning and centering blocks resiliently maintaining the said wheel trim in cushioned centered relationship in respect to the wheel rim.

According to the present invention, the trim ring 42 is provided with a rearwardly facing annular groove 60 therein having a radially outward facing wall 600 preferably formed on a sufficient slope with respect to the cushioning and centering means 20 to firmly engage the same when the wheel trim 21 is sprung thereover and thereagainst as shown in Figs. 9, 10 and 11.

The spring clips 23 employed to secure the wheel trim 21 to the wheel 22 are preferably formed of strip spring steel to provide a reversedly bent and looped head 50 and a curved arm 52 having a wheel trim engaging loop 53 at the outer end thereof. The spring clips 23, preferably five or six of them, are sprung tightly over the lip 30 of the wheel rim 24 onto the curved flange 29 thereof with the transverse edge of the free leg 501 of the looped head 50 thereof disposed in substantial abutment with the bead 540 of the tire 54 which is mounted on the drop center rim 24 in the usual manner. The particular tire illustrated has an inner tube 55 with a valve stem 56 extending therefrom through the valve stem aperture 57 provided in one side wall 26 of the central rim channel 25. It will be noted that when the spring clips 23 are properly positioned onto the flange 29 of the wheel rim 24, the outer free leg 501 of the looped head 50 of the spring clips 23 and the inner reversedly bent edge 502 thereof grip opposite sides of the lip 30 of the wheel flange 29 inwardly from the edge thereof as best shown in Fig. 8.

By reference to Figs. 9, 10 and 11, it will be noted that the looped head 50 of the spring clips 23 distorts when the spring clips 23 are flexed, the extreme end edge of the free leg 501 and the reversedly bent edge 502 thereof gripping the lip 30 of the wheel flange 29 inwardly of the outer edge thereof, the end edge of the free leg 501 remaining against the top of the lip of the rim while the reversedly bent edge 502 pivots against the bottom of the lip of the rim.

In the unloaded position of the spring clip 23 as shown in Fig. 8, the arm 52 thereof is disposed inwardly toward the center of the wheel 22 or the wheel spider 31. If the trim ring 42 were narrower, the arm 52 of the spring clip 23 would dispose itself inwardly toward the side wall 26 of the drop center rim channel 25.

Each of the spring clips 23 has mounted thereon a more or less rectangular resilient wheel trim cushioning and centering block 20 formed with a transverse slot 58 therein and is notched out at 59 to permit it to be readily assembled onto the arm 52 of the spring clip 23 adjacent the looped head 50 thereof.

When the wheel trim engaging loop 53 of each spring clip 23 is engaged into the annular groove 43 of the wheel trim ring 42, the spring clips 23 bias the wheel trim 21 toward and hold it tightly against the cushioning and centering blocks 20 carried by the spring clips 23, see Fig. 11. In this position, the entire wheel trim 21 is firmly held onto the rim 24 of the wheel 22 but spaced slightly therefrom by the cushioning and centering means 20. The outwardly facing wall 600 at the rearwardly facing annular groove 60 of the trim ring 42 engages the said cushioning and centering blocks 20 as the wheel trim 21 snaps into place over the said cushioning and centering blocks 20 as indicated in Figs. 9, 10 and 11 whereupon the said wall 600 of the trim ring 42 coact with the cushioning and centering blocks 20 to center and maintain the wheel trim 21 onto the wheel 22. Any squeaking or drumming or other unwanted noises from the wheel trim 21 is substantially eliminated by the employment of the said cushioning and centering means 20 carried by the spring clips 23 which secure the wheel trim 21 to the wheel 22.

Fig. 10 shows the attitude taken by the wheel trim 21, spring clips 23 and cushioning means 20 when the wheel trim 21 is pulled or held slightly outwardly from the outer lip 30 of the wheel rim 24. The length of the arm 52 of the spring clips 23 is so proportioned in respect to the diameter of the lip 30 of the wheel rim 24 and the diameter of the annular groove 43 in the trim ring 42 of the wheel trim 21 that the pulling of the wheel trim 21 further out as indicated in Fig. 9 will cause an overcenter or toggle action of the spring clips 23 and hold the wheel trim 21 outwardly from the wheel rim 24. In this position, the tire valve stem 56 is readily accessible for inflation of the inner tube 55 of the tire 54. Pushing the wheel trim 21 inwardly from its position shown in Fig. 9 will cause it to snap forcibly into the position thereof shown in Fig. 11, and the spring clips 23 will maintain the wheel trim 21 in such position against the cushioning and centering means 20 carried by the spring clips 23 even when a vehicle equipped therewith is driven over extremely rough and bumpy roads. It will be observed that the wheel trim 21 does not directly contact any portion of the vehicle wheel 22 or hub cap 41, and that the spring clips 23 hold the wheel trim firmly in place against the cushioning and centering means 20.

The employment of the cushioning and centering means 20 on the spring securing clips 23 in combination with a wheel trim 21 having a properly located and formed groove 60 in the rear of the trim ring 42 thereof assures a rattle and noise free spring-securement of the wheel trim 21 centrally in respect to the wheel 22, and at the same time, the wheel trim 21 is held sufficiently free from the lip 30 of the rim 24 of the vehicle wheel 22 to prevent an accumulation of water, dirt, sand or the like in the circumferential pocket formed by the trim ring 42 of the wheel trim 21 and the wheel rim 24.

Although but a single embodiment of the invention has been disclosed and described herein, it is obvious that many changes may be made in the size, shape, arrangement and detail of the various elements of the invention without departing from the spirit and scope thereof as defined in the appended claims.

I claim:

1. In combination with a wheel, wheel trim having an annular axially projecting wall at the rear thereof, spring clips carried by said wheel engaging said wheel trim adapted to bias said wheel trim toward said wheel, and resilient blocks fixed on said spring clips and engageable by said wall of said wheel trim for cushioning and centering said wheel trim in respect to said wheel.

2. In combination with a wheel, wheel trim having an annular radially outwardly facing wall at the rear thereof, spring clips including a looped head clipped on the rim of said wheel and engaging said wheel trim and adapted to bias said wheel trim toward said wheel, and resilient blocks slidably mounted on said spring clips positioned in abutment with the looped head thereof, said wheel trim contacting said resilient blocks to hold the said wheel trim out of contact with said wheel, the annular wall of said wheel trim contacting said resilient blocks to center said wheel trim on said wheel.

3. In combination, a wheel trim member and means for cushioning and centering said member on a wheel comprising spring means for removably securing said wheel trim on a wheel, and non-metallic resilient means carried on said spring securing means and engageable by said wheel trim when the latter is in normal position on the wheel, and an annular radically facing wall at the rear of said wheel trim member adapted to engage said annular resilient means to center said wheel trim on a wheel.

4. In a combination, a wheel structure and a wheel trim, and means for cushioning and centering the wheel trim in respect to the rim of said wheel, said wheel trim having an annular radially outwardly facing wall at the rear thereof, spring means carried by said wheel engaging said wheel trim to bias the said wheel trim toward said wheel, non-metallic resilient means carried by said spring means against which the annular wall of said wheel trim engages as the trim is moved by said spring means toward said wheel.

5. In combination, a wheel structure including a wheel trim and means for cushioning and centering the wheel trim in respect to said wheel, said wheel trim having a rearwardly open groove at the rear thereof and said groove having a side wall, spring means carried by said wheel rim and engaging said wheel trim and biasing said wheel trim toward said wheel, non-metallic resilient means carried by said spring means in a fixed position thereon and against which said wheel trim becomes positioned when biased by said spring means toward said wheel, said side wall of the annular groove of said wheel trim being sloped to contact said resilient means to center the said wheel trim on said wheel as said wheel trim moves toward said wheel.

References Cited in the file of this patent

UNITED STATES PATENTS

| 2,076,789 | Le Jeune | Apr. 13, 1937 |
| 2,394,958 | Wood | Feb. 12, 1946 |